United States Patent Office 3,010,918
Patented Nov. 28, 1961

3,010,918
CHEMICAL COMPOUNDS
Carol K. Ikeda, Wallingford, Pa., assignor to E. I. du Pont de Nemours and Company, Wilmington, Del., a corporation of Delaware
No Drawing. Filed May 26, 1958, Ser. No. 737,507
39 Claims. (Cl. 260—17)

This invention relates to a new class of chemical compounds and more particularly to chemical compounds containing a plurality of radicals having the following structural formula:

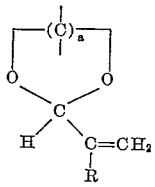

in which

represents carbon atoms in the ring, "a" being an integer having a value of at least 3, all but 1 (i.e. 2a−1) of the valences of said carbon atoms being satisfied by monovalent radicals of the class consisting of hydrogen, alkyl, aryl, alkaryl, aralkyl, chloroalkyl, fluoroalkyl, alkoxyalkyl, fluoro, chloro, cyano, chloroalkoxyalkyl, fluoroalkoxyalkyl, cyanoalkoxyalkyl, cyanoalkyl, alkenyl, acylamido phenylsulfonyl, chloroaryl and fluoroaryl, and R is a monovalent radical of the class consisting of hydrogen, alkyl, alkenyl, aryl, chloro, fluoro, bromo, cyano, acyloxy, chloroalkyl fluoroalkyl cyanoalkyl, alkoxy, aryloxy, and carbalkoxy. The unsatisfied valence of one of the carbon atoms in the chain represented by

is the valence through which the cyclic radical is connected to the remainder of the compound.

The invention also relates to compositions containing these new compounds.

I have found that these new compounds have the unexpected and unique property of polymerizing and becoming insoluble in liquids which are solvents for the starting compounds when such compounds are exposed to oxygen. This property distinguishes these new compounds from other vinyl-containing compounds the polymerization of which is inhibited by oxygen. This insolubilization is brought about most quickly and effectively in the presence of a small proportion of the kind of siccative metal compounds used as paint driers.

Analyses by chemical and infra red absorption techniques indicate that this property evolves as a result of a new and unique mechanism in which oxygen is absorbed, acrylic ester and hydroxyl structures progressively appear, and the cyclic acetal structure and vinyl unsaturation progressively disappear as the insolubilization proceeds.

The characteristic common to all of these new compounds is the presence of a plurality of the radicals for which the structural formula is shown above. This radical is referred to herein for the sake of brevity as the 2-vinyl-1,3-cyclic acetal radical, or simply the vinyl cyclic acetal radical, it being understood that a substituent other than hydrogen can be attached to the alpha carbon atom of the vinyl radical as indicated, that the carbon atoms in the ring can vary in number as indicated and can have substituents as indicated.

For reasons of economy, ease of operation and availability of suitable starting materials, the preferred number of 2-vinyl-1,3-cyclic acetal radicals in a given compound is 2 to 4, although higher numbers can be made. For example, six of such radicals can be attached to a hexavalent radical derived from mellitic acid. Obviously mixtures of compounds can yield compositions in which the overall average number of vinyl cyclic acetal radicals per molecule is not a whole number.

From the standpoint of rapid air-drying or insolubilization in the presence of oxygen, the preferred new compounds are those in which the vinyl cyclic acetal equivalent does not exceed about 500; in other words, the weight of compound required to provide one gram mole of cyclic acetal radical does not exceed about 500 grams.

The polyvalent connecting radical which joins a plurality of the vinyl cyclic acetal radicals is not critical. However it will be obvious to persons skilled in the polymerization art that substituents known to have an inhibiting effect on vinyl polymerization should be avoided or placed in a shielded or sterically hindered position so that the inhibiting effect is minimized. Likewise strongly acidic radicals which tend to open the cyclic acetal ring, and radicals which form insoluble complexes with metallic driers, are preferably avoided. Such obvious precautions yield compounds which offer the maximum advantages of this invention.

Examples of suitable polyvalent connecting radicals are:

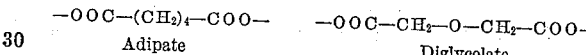

Adipate · · · · · · Diglycolate

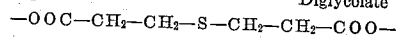

Thiodipropionate

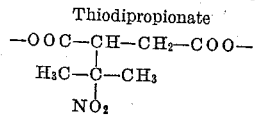

3-methyl-3-nitro-butane-1,2-dicarboxylate

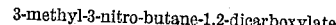

Oxysuccinate

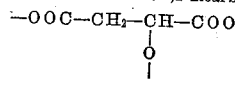

Maleate · · · · · Itaconate

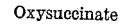

Azodicarboxylate · · · Cyanosuccinate

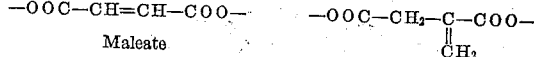

Cyclohexene-dicarboxylate · · · Phthalates · · · 2,5-di(trifluoromethyl) terephthalate

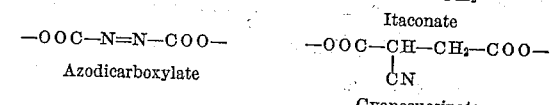

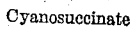

Pyromellitate · · · Dihydrotrimethylpyridine-dicarboxylate

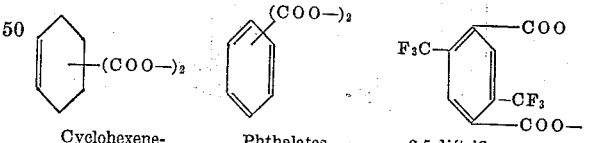

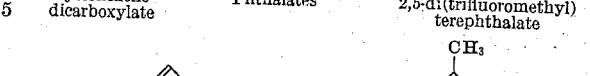

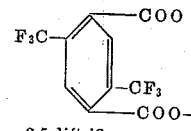

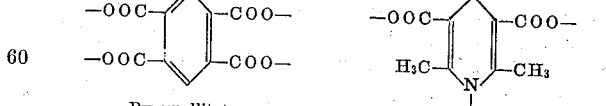

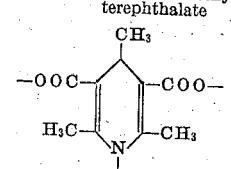

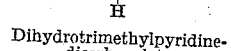

Chlorendate · · · Cyanurate

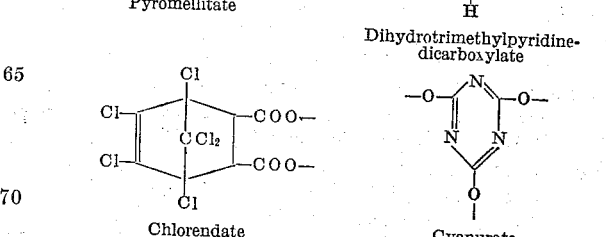

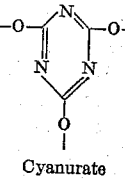

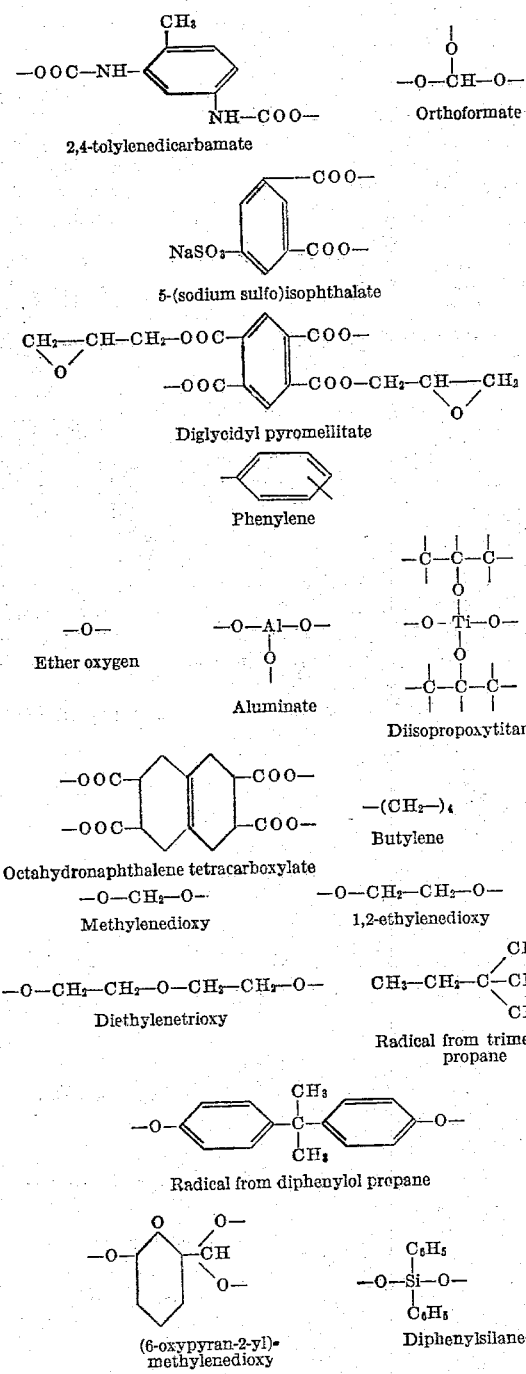

2,4-tolylenedicarbamate

Orthoformate 5-(sodium sulfo)isophthalate

Diglycidyl pyromellitate

Phenylene

Ether oxygen    Aluminate    Diisopropoxytitanate

Octahydronaphthalene tetracarboxylate    —(CH₂—)₄
Butylene

—O—CH₂—O—     —O—CH₂—CH₂—O—
Methylenedioxy        1,2-ethylenedioxy

—O—CH₂—CH₂—O—CH₂—CH₂—O—    Radical from trimethylo propane
Diethylenetrioxy

Radical from diphenylol propane (6-oxypyran-2-yl)-methylenedioxy    Diphenylsilanedioxy Other connecting radicals are apparent from the nature of those given above and still others will become apparent as the description of the invention proceeds.

In addition to compounds containing vinyl cyclic acetal radicals and connecting radicals as illustrated above, this invention includes compounds containing no connecting radical between the cyclic acetal rings, and compounds containing bivalent intermediate or bridging radicals between the cyclic acetal rings and the polyvalent connecting radical. Such bridging radicals usually enter the system as substituents in the polyhydroxy starting materials from which the cyclic acetal rings evolve. Illustrations of the kinds of combinations discussed in this paragraph follow directly.

In the case of a bisacrolein acetal of hexane-1,3,4,6-tetrol, there is no connecting radical, the two vinyl cyclic acetal radicals being attached directly to each other.

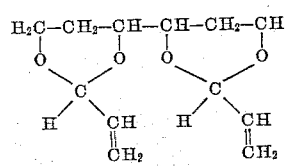

In the case of a bisacrolein acetal of 2,5-dimethylol-1,6-hexanediol, there is a hydrocarbon connecting radical —CH₂—CH₂—:

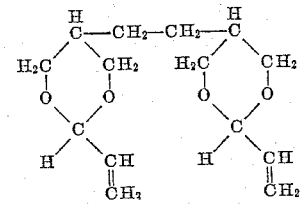

In the case of the terephthalic acid diester of the acrolein acetal of trimethylolmethane there is a terephthalate connecting radical

and a methylene bridging radical —CH₂— at each end of the connecting radical:

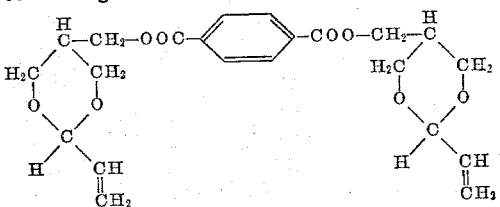

In the immediately foregoing illustrations, divalent connecting radicals are used for simplicity, but it is to be understood that the principle illustrated pertains also to trivalent and higher polyvalent connecting radicals. Furthermore, for the purpose of simplicity in these illustrations, the cyclic acetal rings all contain six atoms, i.e. the value of "a" in

is three, and hydrogen atoms satisfy all of the valences of the

carbon atoms except that one required to connect the ring to the remainder of the compound. It is to be understood that the number of ring carbon atoms and the substituents thereon can vary as previously described.

Examples of suitable bivalent bridging radicals are:

—(CH₂—)₁₋₁₆    —CHR— where R is alkyl, aryl, alkenyl

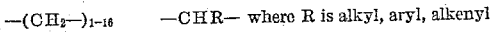
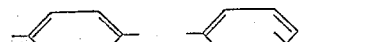

—(OCH₂CH₂—)₁₋₅    —CH₂—(OCH₂CH₂—)₁₋₅

In the vinyl cyclic acetal radical common to all of the compounds of this invention, there appears as a substituent on the number 2 carbon atom the group

in which R is H, alkyl, alkenyl, aryl, chloro, fluoro, bromo, cyano, acyloxy, chloroalkyl, fluoroalkyl, cyanoalkyl, alkoxy, aryloxy, or carbalkoxy. Examples of suitable R groups other than hydrogen are methyl, ethyl, propyl, butyl, vinyl, phenyl, chloro, fluoro, bromo, cyano, acetoxy, butyroxy, benzoyl, chloromethyl, fluoroethyl, cyanoethyl, methoxy, butoxy, phenoxy, carbomethoxy, and carbethoxy. A convenient source of such a radical for this position is acrolein or an appropriate alpha-substituted acrolein which, under the conditions used here, condenses with a polyhydroxy compound in typical aldehyde or ketone fashion:

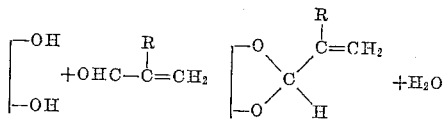

In some cases it is easier to generate the

substituent in the number 2 position of a preformed cyclic acetal ring than it is to obtain the corresponding alpha-substituted acrolein for condensation with a polyhydroxy compound in the manner described directly above. For example an intermediate having the structural formula

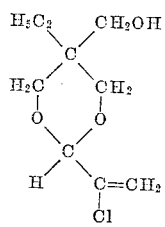

is prepared by dehydrochlorinating a cyclic acetal, having a structural formula as follows, prepared by condensing 2,3-dichloropropionaldehyde and trimethylolpropane

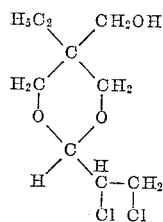

Esters being a preferred form of a new compounds of this invention, the method of preparing them will serve as a guide to the preparation of other forms by analogous reactions.

I believe the most convenient method is, first to prepare a hydroxyalkyl-2-vinyl-1,3-cyclic acetal by condensing acrolein, or an alpha-substituted acrolein in which the substituent is the R prescribed in the structural formula set forth above, with a triol such as 1,1,1-trimethylol propane under closely controlled acidic conditions. (Trimethylolpropane typifies polyhydroxy compounds in which hydroxyl substituents are separated from each other by at least 3 carbon atoms, which characteristic is required of polyhydroxy compounds that are useful in preparing the new compounds of this invention.) A preferred process for accomplishing this is disclosed and claimed in the copending application of Armand Edward Brachman Serial No. 728,546, filed April 15, 1958.

Then the desired ester is prepared by reacting the product of the first step with a lower alkyl ester of the desired polycarboxylic acid under ester interchange conditions while removing the lower alkanol by-product.

Other methods of preparing the esters include (1) reacting the hydroxyalkyl-2-vinyl-1,3-cyclic acetal with the acid chloride of the desired polycarboxylic acid under basic conditions, and (2) reacting an acetoxyalkyl-2-vinyl-1,3-cyclic acetal with the desired polycarboxylic acid or a lower alkyl ester thereof under esterification or ester interchange conditions while removing acetic acid or alkyl acetate.

Still another method is, first, to prepare a haloalkyl-2-vinyl-1,3-cyclic acetal by condensing acrolein or a substituted acrolein as described above with an epihalohydrin and, second, to prepare the desired ester by reacting the product of the first step with a salt of the desired polybasic acid.

Considering a convenient and preferred method in more detail, a hydroxyalkyl-2-vinyl-1,3-cyclic acetal is prepared by condensing substantially equimolar proportions of acrolein and a triol such as trimethylolpropane under mild acid conditions, e.g. in the presence of a catalytic amount of a mildly acidic compound such as ammonium chloride or an acid having a low dissociation constant such as oxalic acid or phosphoric acid. Strong acids alone tend to promote side-reactions, to lower yield and to cause gelation. The reaction is preferably carried out in a solvent having the property of forming a binary with water, such as hexane, toluene, benzene, ether, methylene chloride, the solvent being present in an amount which permits distillation and removal of the water of reaction from the charge at a moderate temperature, e.g. less than 130° C. and preferably 50°–110° C. Higher temperatures tend to reduce reaction time but promote an undesirable side-reaction presumably involving the addition of a hydroxyl group of the triol across the double bond of the acrolein. Lower temperatures tend to minimize this side-reaction but also slow down the desired reaction. The preferred range of 50°–110° C. usually provides the maximum yield for a convenient reaction period, not exceeding about 24 hours, during which substantially all of the water of reaction is removed. A vinyl polymerization inhibitor such as hydroquinone or t-butyl catechol is preferably present. The resulting crude product can be used directly in the succeeding esterification, but purification by conventional procedures such as washing and/or fractionation is usually desirable.

In converting the resulting hydroxyalkyl-2-vinyl-1,3-cyclic acetal to a polycarboxylic acid ester, direct esterification with the acid or an anhydride thereof is preferably avoided due to a tendency toward opening the cyclic acetal ring. It is preferred to introduce the acid moiety in a substantially chemically equivalent amount as an alkyl ester (e.g. methyl, butyl, lauryl) and to force the reaction to completion by distilling off the corresponding alcohol. This is preferably done under basic ester-interchange conditions, e.g. in the presence of a catalytic amount of a basic catalyst such as an oxide, hydroxide, carbonate or alkoxide of an alkali or alkaline earth metal. Useful products can be made by using substantially more than a chemically equivalent proportion of either reactant, or by using a mixture of mono- and polycarboxylic acid moieties, whereby a mixture of esters is obtained, provided a substantial proportion thereof is an ester containing a plurality of vinyl cyclic acetal groups corresponding to the previously described general formula. The reaction is most conveniently carried out in the presence of a solvent which forms a binary with the alcohol by-product, such as toluene or benzene, whereby the alcohol can be removed by distillation. Any temperature between the boiling point of the binary and the decomposition temperature of the components of the charge can be used, but a preferred range is 50°–225° C. The reaction is considered complete when the vapor temperature is substantially above the boiling point of the binary. This usually requires not more than 6 hours. If a product free of solvent is desired, the solvent can be distilled off, preferably under vacuum. If a vinyl polymerization inhibitor is present, it should be removed for best results in end uses involving the previously described insolubilization by polymerization. For example, hydroquinone can be removed with a sodium hydroxide wash. The product is useful without further purification as a coating material, for example, or as a film-forming component of mixed coating compositions, but if higher purity is desired, the product can be fractionated or purified by well known techniques.

In preparing the vinyl cyclic acetal esters of this invention, it is particularly preferred to carry out the esterification reaction in the presence of an alkyl orthotitanate. Such orthotitanates favor the desired reaction. For example, in the ester interchange of hydroxyalkyl-2-vinyl-1,3-cyclic acetals with compounds such as diethyl acetone dicarboxylate, diethyl dicyanomalonate, and unsaturated acid esters such as diethyl maleate and diethyl itaconate, carrying out the reaction in the presence of an alkyl orthotitanate greatly reduces by-product impurities and increases yields. 1 to 6 carbon atom alkyl orthotitanates, that is, titanates having the formula $Ti(OR)_4$ wherein R represents an alkyl radical of from 1 to 6 carbon atoms and particularly tetra-isopropyl titanate are preferred because they do not have an appreciable vapor pressure, yet under the reaction conditions, are readily distillable. Although the amount of orthotitanate is not critical, from 5 to 20 parts by weight per mole of the cyclic acetal are preferred.

Examples of polyhydroxy compounds which are suitable as starting materials for preparing 2-vinyl-1,3-cyclic acetals, and particularly for preparing especially convenient hydroxyalkyl-, carboxyl-, and carboxylate-substituted-2-vinyl-1,3-cyclic acetals are:

For cyclic acetals containing 6 atoms in the cyclic acetal ring ($a=3$); trimethylolmethane, trimethylolethane, trimethylolpropane, trimethylolbutane, methyl 3,5-dihydroxy hexanoate, 1-phenyl-2-hydroxymethyl-1,3-propanediol, ethyl 4-(1',3'-dihydroxypropyl)cyclohexane carboxylate.

For cyclic acetals containing 7 atoms in the cyclic acetal ring ($a=4$); 1,4,7-heptanetriol, ethyl 8,11-dihydroxystearate, 3-carbethoxy-2,5-hexanediol.

For cyclic acetals containing 8 atoms in the cyclic acetal ring ($a=5$); 4-hydroxymethyl-1,7-heptanediol, 2-carbethoxymethyl-1,5-pentanediol, ethyl 3,7-dihydroxy octanoate.

For cyclic acetals containing 9 atoms in the cyclic acetal ring ($a=6$); 3-carbethoxy-1,6-hexanediol.

These typify polyhydroxy compounds in which the hydroxyl substituents are separated from each other by at least 3 carbon atoms. From such polyhydroxy compounds 2-vinyl cyclic acetals containing 6, 7, 8, 9 or more atoms in the cyclic acetal ring can be prepared by condensation with acrolein or an alpha-substituted acrolein described above.

Examples of polycarboxylic acids which are suitable for preparing the esters of this invention are:

Dicarboxylic acids: malonic, succinic, glutaric; 1,1-propanedicarboxylic, adipic, pimelic, suberic, azelaic, sebacic, dimerized vegetable oil acids (predominantly dimers of unsaturated $C_{18}$ fatty acids), maleic, fumaric, acetylene dicarboxylic, itaconic; ortho-, iso- and terephthalic acids and their di-, tetra- and hexahydro derivatives; cyclopentane dicarboxylic, cyclopropane dicarboxylic, camphoric, naphthalene dicarboxylic, hydrogenated naphthalene dicarboxylic acids, dicyclopentadiene dicarboxylic, 3,6-endomethylenetetrahydrophthalic, diglycolic, thiodipropionic, cyclohexene dicarboxylic, dihydrotrimethylpyridine dicarboxylic, chlorendic (hexachloroendomethylenetetrahydrophthalic), acetone dicarboxylic, acetamidomalonic, bis(cyanoethyl)malonic, azodicarboxylic, 3-methyl-3-nitrobutane-1,2-dicarboxylic, citraconic.

Tricarboxylic acids: tricarballylic, aconitic; 1,2,3-cyclopropane tricarboxylic, hemimellitic, trimerized vegetable oil acids (predominantly trimers of unsaturated $C_{18}$ fatty acids).

Tetracarboxylic acids: pyromellitic, naphthalene tetracarboxylic, hydrogenated naphthalene tetracarboxylic.

Pentacarboxylic acids: benzene pentacarboxylic acid.

Hexacarboxylic acids: mellitic acid.

Miscellaneous other suitable polycarboxylic acids include maleic-modified rosin acids, and maleic-modified tall oil acids.

When the ester is derived from an unsaturated aliphatic acid having an activated double bond, such as maleic, an additional hydroxy-substituted cyclic acetal group can become attached at the double bond via addition of hydroxyl across the double bond. Thus, maleic acid can yield the diester of the corresponding oxysuccinate. Addition across the double bond can be prevented or minimized by using an alkyl orthotitanate as the esterification catalyst.

In the preparation of esters, the acid moiety need not be carboxylic. Amphoteric compounds and radicals and other compounds and radicals which can act as acids are useful in preparing the esters of this invention; for example, cyanuric acid and ortho esters of acids of silicon, titanium, aluminum, boron, phosphorus and the like.

Urethane linkages, for example as derived from polyisocyanates, are also useful as connecting radicals. Suitable linkages also include a single ether oxygen atom and a plurality of ether oxygen atoms associated with, for example, hydrocarbon radicals as set forth in certain of the radicals listed above. The illustrative working examples provided hereinafter will describe typical procedures for preparing compounds which depend on linkages other than ester linkages to join a plurality of vinyl cyclic acetal groups directly or indirectly.

It is to be understood that mixtures of reactants of the same general class can be used in place of a single reactant of that class in preparing the products of this invention. For example, mixtures of suitable polyhydric alcohols and/or mixtures of suitable homologs of acrolein can be used in preparing the vinyl cyclic acetal moiety. Likewise, in the ester preparations, mixtures of suitable acid moieties and/or suitable vinyl cyclic acetal moities can be used. Furthermore, when products are made from either one or more species of the different classes of reactants, the resulting single or mixed reaction products can be blended with each other to yield mixed compositions having desirable characteristics of the separate components.

The preferred new compounds of this invention are the liquid ones because these lend themselves to the easy preparation of solvent-free liquid end products, a type especially desirable because the cost and fire hazard of solvents are eliminated. However, the new compounds which are highly viscous or solid are readily soluble in common solvents and can be used in solution form.

Suitable solvents include aliphatic and aromatic liquid hydrocarbons, esters, ketones, alcohols and mixtures thereof.

The new compounds can be used as clear, unpigmented coating compositions, with solvent if required for convenience of application, or they can be pigmented, using proportions well known in the art, with pigments commonly used in the coating art, such as metal oxides, sulfides, sulfates, silicates, chromates, iron blues, organic colors, and metal flake pigments. As is the case with other air-drying materials, some pigments inhibit drying. These are to be avoided in coating compositions formulated to dry at ordinary temperatures, but they can be used if the coatings can be force-dried or baked.

The new compounds, individually or mixed, can be the sole organic film-forming component of coating compositions, or they can be blended with other well known film-formers such as glyceride oils, oil-modified alkyd resins, oleoresinous varnishes, alkylated urea aldehyde resins, alkylated melamine aldehyde resins, polyepoxy-polyhydroxy resins, phenol aldehyde resins, cellulose acetate, cellulose acetate butyrate, polymers and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; polyurethanes, and silicones.

Other common ingredients of organic film-forming compositions can be used in the manner and in proportions well known in the art. These include plasticizers, catalysts, hardeners, anti-skinning agents and surface active agents. Particularly included in this class of additives are metallic driers, i.e. the commonly used naphthenate, linoleate, resinate, tallate, octoate(2-ethyl hexoate) or other salts or soaps of siccative metals such as cobalt, lead, iron, manganese, zinc, calcium, nickel and copper. Such driers are commonly used in the art to speed up the drying and ultimate insolubilization of air-drying compositions, and they have a similar effect on the new compounds and compositions of this invention. Thus, compositions derived from the new compounds preferably contain one or more of such driers. A particularly preferred drier metal is cobalt. The proportion of drier is usually within the range of 0.0005%–3% of metal (in the drier) based on the weight of organic film-forming material.

It is well known that the drying speed of air-drying compositions can be increased not only by adding drier but also by heating, or a combination thereof. The drying, polymerization or insolubilization of compositions containing the new compounds of this invention can likewise be hastened. Temperatures moderately above room-temperature, e.g. 100°–150° F., usually hasten drying enough but, where desirable, the compositions can be baked at higher temperatures, e.g. 200°–400° F. for short periods.

The polymerized compositions are homopolymers or copolymers of the individual compounds or the mixtures thereof used. Due to their insolubility, they are considered to be highly cross-linked. While the new compounds are most useful in substantially monomeric form, they can be homopolymerized, or copolymerized with other vinyl monomers. Usually a low degree of polymerization is preferred since in this condition the compositions can be applied as coatings which dry in air to an insoluble state by further polymerization.

The utility of the new compounds and the new compositions of this invention is not limited to coatings, although this is a preferred use. Specific coating uses include the painting of structural steel (particularly rusty steel or steel having mill scale on the surface), automobiles, refrigerators, washing machines, furniture, office equipment, partitions and other industrial products. Some of the new compounds and new compositions are particularly useful where the coated article is subsequently formed into a final product as in the case of cans, Venetian blinds, siding for buildings and screw caps for containers. Further coating uses include architectural paints and enamels, paper and fabric coatings, and electrical insulation. Other uses include calks and putties, molding and casting resins, modifiers and matrices for polymers, ingredients in copolymers, chemical intermediates, fiber treatments and modifiers, impregnants for fabrics and papers, adhesives and bonding agents, unsupported sheeting, and stencilling and printing inks for paper, textiles, linoleum, containers and the like.

The following examples are provided to illustrate the principles and practice of this invention, but it is not limited by the specific embodiments illustrated. Parts and percentages are given by weight unless otherwise specified.

EXAMPLE 1

*Preparation of 5-hydroxymethyl-5-methyl-2-vinyl-1,3-dioxane*

A two liter, three-necked flask equipped with a thermometer, a stirrer and a continuous water separator is charged with 600 g. (5 mols) of 1,1,1-trimethylolethane, 280 g. (5 mols) of acrolein containing a trace of hydroquinone inhibitor, 375 g. of hexane, and 7.5 g. of oxalic acid. The mixture is refluxed (50°–69° C.) with continuous removal of water for 6.5 hrs. (99 ml. distillate removed). The mixture is freed of hexane and acrolein by heating to 60° C. and gradually reducing the pressure to less than 1 mm. Hg. Vacuum distillation (81°–92° C./0.5–1 mm. Hg) of the residue gives 668 g. of water-white oil. The oil is dissolved in a mixture of 350 ml. of hexane and 350 ml. of benzene, washed once with 150 ml. of aqueous 20% sodium hydroxide and thrice with 150 ml. portions of aqueous 15% sodium chloride. The organic phase is dried over anhydrous magnesium sulfate, filtered and substantially freed of solvent by heating to 60° C. and gradually reducing the pressure to less than 1 mm. Hg. 623 g. of 5-hydroxymethyl-5-methyl-2-vinyl-1,3-dioxane are obtained.

*Preparation of sebacic acid diester of 5-hydroxymethyl-5-methyl-2-vinyl-1,3-dioxane*

A three liter, three-necked flask equipped with a thermometer, a stirrer, a nitrogen inlet and an 18-inch helix-packed column topped with a total reflux head is charged with 115 g. (0.5 mol) of dimethyl sebacate, 190 g. (1.2 mols) of 5-hydroxymethyl-5-methyl-2-vinyl-1,3-dioxane, 130 g. of toluene and 1 g. of sodium carbonate. The system is purged with nitrogen, and about 43 g. of toluene are distilled off to dry the reaction mixture and the apparatus. After cooling to about 30° C., 1 g. of sodium methoxide is added, and the mixture is heated to reflux. Toluene-methanol binary is distilled off during the ensuing 3 hrs. A total of 64 ml. of distillate are collected. The charge is cooled to room temperature and dissolved in a mixture of 88 g. of benzene and 100 g. of hexane. The resulting solution is washed six times with 100 g. portions of water, and the organic phase is separated and dried over anhydrous magnesium sulfate. After filtering, the mixture is substantially freed of solvent and unreacted 5-hydroxymethyl-5-methyl-2-vinyl-1,3-dioxane by successively heating at about 60° C., then about 150° C., at about 1 mm. Hg. A substantially quantitative yield of sebacic acid diester of 5-hydroxymethyl-5-methyl-2-vinyl-1,3-dioxane is obtained.

In relating this compound to the previously described structural formula and radicals, it is seen that the value of "$a$" is 3 (there are 4 carbon and 2 oxygen atoms in each ring), the $2a-1$ monovalent substituents on the

carbon atoms consist of 1 methyl and 4 hydrogen radicals, R is hydrogen, and the whole connecting moiety between two cyclic acetal rings is —$CH_2OOC(CH_2)_8COOH_2$— in which each terminal —$CH_2$— group acts as a bridge between a cyclic acetal ring and the divalent connecting radical —$OOC(CH_2)_8COO$—.

EXAMPLE 2

*Preparation of 4-hydroxypropyl-2-vinyl-1,3-dioxepane*

A three liter, three-necked flask equipped with a thermometer, a stirrer and a continuous water separator is charged with 740 g. (5 mols) of 1,4,7-heptanetriol), 280 g. (5 mols) of acrolein containing a trace of hydroquinone inhibitor, 375 g. of hexane, 5 g. of oxalic acid and 5 g. of hydroquinone. The mixture is refluxed (50°–67° C.) with continuous removal of water for 24 hrs. (116 ml. removed). The mixture is freed of hexane and acrolein by heating to 60° C. and gradually reducing the pressure to less than 1 mm. Hg. Vacuum distillation (about 1 mm. Hg) yields 700 g. of water-white oil. This is dissolved in 700 g. of benzene, washed once with 300 ml. of aqueous 5% sodium hydroxide, once with 300 ml. of aqueous 5% sodium chloride and once with 300 ml. of aqueous 0.5% sodium bicarbonate. The organic phase is dried over anhydrous magnesium sulfate, filtered and substantially freed of benzene at reduced pressure. After heating 30 min. at 50°–60° C./1 mm., 650 g. of 4-hydroxypropyl-2- vinyl-1,3-dioxepane, more specifically 4-(3-hydroxypropyl)-2-vinyl-1,3-dioxepane, are obtained.

Preparation of orthophthalic acid diester of 4-hydroxypropyl-2-vinyl-1,3-dioxepane A three liter, three-necked flask equipped with a thermometer, a stirrer, a nitrogen inlet and an 18-inch helix-packed column topped with a total reflux head is charged with 194 g. (1 mol) of dimethyl orthophthalate, 446 g. (2.4 mols) of 4-hydroxypropyl-2-vinyl-1,3-dioxepane and 260 g. of toluene. The system is purged with nitrogen, and about 86 g. of toluene are distilled off to dry the reaction mixture and the apparatus. After cooling to about 30° C., 3 g. of sodium methoxide is added, and the mixture is heated to reflux. Toluene-methanol binary is distilled off during the ensuing 2.5 hours. A total of 125 ml. of distillate are collected. The charge is cooled to room temperature and dissolved in a mixture of 220 g. of benzene and 300 g. of hexane. The resulting solution is washed four times with 200 g. portions of water, and the organic phase is separated and dried over anhydrous magnesium sulfate. After filtering, the mixture is substantially freed of solvent and unreacted 4-hydroxypropyl-2-vinyl-1,3-dioxepane by successively heating at about 60° C., then about 150° C., at about 1 mm. Hg. A substantially quantitative yield of orthophthalic acid diester of 4-hydroxypropyl-2-vinyl-1,3-dioxepane is obtained.

In relating this compound to the previously described structural formula and radicals, it is seen that the value of "$a$" is 4 (there are 5 carbon atoms and 2 oxygen atoms in each ring, the $2a-1$ monovalent substituents on the

carbon atoms are hydrogen atoms, R is hydrogen, and the whole connecting moiety between two cyclic acetal rings is

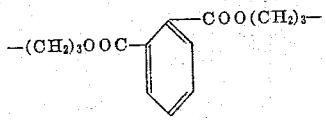

in which each set of terminal $(CH_2)_3$ groups acts as a bridge between a cyclic acetal ring and the divalent connecting radical

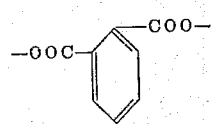

Using as a guide the relations described in the two preceding examples between the structure of the compounds prepared therein and the structural requirements of this invention, the corresponding relations can be determined in the succeeding examples merely by examining the structural formulas of the compounds disclosed.

EXAMPLE 3

Preparation of maleic acid diester of 5-hydroxymethyl-5-methyl-2-vinyl-1,3-dioxane 43 parts of diethyl maleate, 82 parts of 5-hydroxymethyl-5-methyl-2-vinyl-1,3-dioxane, and 175 parts of toluene together with 3 parts of tetraisopropyl titanate are refluxed at about 77° C. for about 4 hours. Finally, 200 parts of toluene are added to the reaction mixture, then the mixture is washed with water, dried with calcium sulfate, filtered and heated under a pressure of about 20 mm. of mercury absolute to strip off the low boiling materials. A diester product is obtained by fractionation at a temperature of about 130° C. under a pressure of about 1 mm. of mercury absolute. Other alkyl orthotitanates, as described above, can be substituted for the isopropyl homolog used in this example with substantially equal results.

EXAMPLE 4

Preparation of acetonedicarboxylic acid diester of 5-hydroxymethyl-5-methyl-2-vinyl-1,3-dioxane 80 parts of diethyl acetone dicarboxylate, 133 parts of 5-hydroxymethyl-5-methyl-2-vinyl-1,3-dioxane, 76 parts of toluene, and 6 parts of tetraisopropyl titanate are refluxed for 5 hours at about 74° to 76° C. The reaction mixture is then washed and fractionated as described in the preceding example.

EXAMPLES 5–12

The following polycarboxylic acid esters of 5-hydroxymethyl-5-methyl-2-vinyl-1,3-dioxane (Examples 5–12) are prepared by the general procedures outlined in the foregoing examples and discussion:

Example 5.—Orthophthalic diester from 49.5 parts of dimethylorthophthalate, 78.6 parts of the dioxane, and 5 parts of sodium methoxide in 60 parts of toluene.

Example 6.—Terephthalic diester from 97 parts of dimethylterephthalate, 172 parts of the dioxane and 1.5 parts of sodium methoxide in 125 parts of toluene.

Example 7.—Pyromellitic tetraester from 55 parts of tetramethyl pyromellitate, 123 parts of the dioxane, and 1.2 parts of sodium methoxide in 100 parts of toluene.

Example 8.—Tetrahydronaphthalene-1,2,6,7-tetraester from 50 parts of tetrahydronaphthalene tetramethylcarboxylate, 97 parts of the dioxane and 1 part of sodium methoxide in 120 parts of toluene.

Example 9.—(5 - methyl - 2-vinyl-1,3 - dioxane - 5-yl) methoxysuccinic diester from 74 parts of diethyl maleate, 210 parts of the dioxane and 0.25 part of metallic sodium in 175 parts of benzene.

Example 10.—Thiodipropionic diester from 51.5 parts of dimethyl-beta-thiodipropionate, 86.5 parts of the dioxane and 1.5 parts of sodium methoxide in 300 parts of toluene.

Example 11.—Trimerized 18-carbon atom vegetable oil acid triester from 100.8 parts of the tributyl ester of the trimerized acid (Emery Industries Product No. 3055S), 50.2 parts of the dioxane, and 1.5 parts of sodium methoxide in 175 parts of xylene.

Example 12.—Itaconic diester from 39.5 parts of dimethyl itaconate, 81.5 parts of the dioxane, 3 parts of tetraisopropyl titanate and 0.2 part of hydroquinone polymerization inhibitor in 175 parts of toluene.

EXAMPLES 13–19

The following Examples 13–19 relate to illustrative polycarboxylic acid esters of 4-hydroxypropyl-2-vinyl-1,3-dioxepane.

Example 13.—Adipic diester from 87 parts of dimethyl adipate, 195 parts of the dioxepane and 2 parts of sodium methoxide in 200 parts of toluene.

Example 14.—Azelaic diester from 100 parts of azelaic acid and 215 parts of the dioxepane in 250 parts of xylene (8 hours at 170°–205° C.).

Example 15.—Diglycolic diester from 40.5 parts of dimethyl diglycolate, 112 parts of the dioxepane and 1.5 parts of sodium methoxide in 70 parts of toluene.

Example 16.—Homocyclopentane tetraester from 39.3 parts of homocyclopentane tetramethyl carboxylate, 101 parts of the dioxepane and 2 parts of sodium methoxide in 200 parts of toluene.

Example 17.—Dimerized 18 carbon atom vegetable oil acid diester from 71.2 parts of the dibutyl ester of the dimerized acid ("Empol" 1022, Emery Industries), 41 parts of the dioxepane, and 1.5 parts of sodium methoxide in 160 parts of xylene.

Example 18.—Isophthalic diester from 38.8 parts of dimethyl isophthalate, 82 parts of the dioxepane, and 2 parts of sodium methoxide in 150 parts of toluene.

*Example 19.*—The diester having the following structural formula

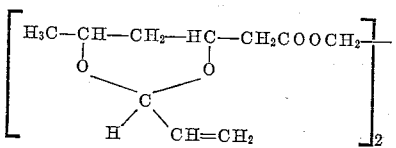

from 40 parts of

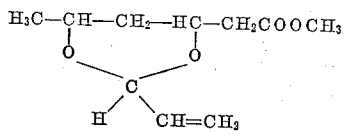

(the equimolar condensate of acrolein and methyl 3,5-dihydroxyhexanoate in the presence of ammonium chloride), 9.3 parts of ethylene glycol and 1.5 parts of sodium methoxide in 75 parts of toluene.

EXAMPLES 20–26

The following Examples 20–26 illustrate new compounds of this invention other than polycarboxylate esters.

*Example 20.*—The tricyanurate from 24.9 parts of triallylcyanurate, 47.1 parts of 5-hydroxymethyl-5-methyl-2-vinyl-1,3-dioxane, and 2 parts of sodium methoxide in 200 parts of toluene at 80°–110° C. by the general procedure used in the esterification step of Examples 1 and 2.

*Example 21.*—The diurethane from 34.8 parts of tolylene diisocyanate and 41 parts of 4-hydroxypropyl-2-vinyl-1,3-dioxepane. The diisocyanate is added dropwise at 20°–65° C.

*Example 22.*—The triorthoformate from 29.6 parts of triethyl orthoformate and 84.5 parts of 4-hydroxypropyl-2-vinyl-1,3-dioxepane in 125 parts of toluene at 60°–110° C. by the general procedure used in the esterification step of Examples 1 and 2.

*Example 23.*—The triorthoaluminate from 20.4 parts of aluminum triisopropoxide and 47.2 parts of 5-hydroxymethyl-5-methyl-2-vinyl-1,3-dioxane in 125 parts of toluene at 80°–110° C. by the general procedure used in the esterification step of Examples 1 and 2.

*Example 24.*—The diorthotitanate from 71 parts of titanium tetraisopropoxide and 82.5 parts of 5-hydroxymethyl-5-methyl-2-vinyl-1,3-dioxane at 80°–140° C. by the general procedure used in the esterification step of Examples 1 and 2. In this compound the remaining two valences of the titanium are satisfied by isopropoxide radicals.

*Example 25.*—The diphenylol propane diether from 390 parts of 2,2-bis[para(1',3'-dihydroxybutoxy)phenyl] propane, 112 parts of acrolein and 3 parts of ammonium chloride in 400 parts of toluene at 70°–90° C. by the general procedure used in the first part (hydroxy-dioxane preparation) of Example 1.

*Example 26.*—A compound having the structural formula

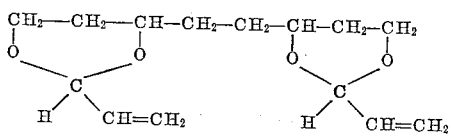

from 225 parts of octane-1,3,6,8-tetrol, 112 parts of acrolein and 2 parts of ammonium chloride in 200 parts of toluene by the general procedure used in the first part (hydroxy-dioxane preparation) of Example 1.

EXAMPLES 27–66

The following Examples 27–66 illustrate additional new compounds of this invention having a wide variety of cyclic acetal rings, bridging radicals, connecting radicals and other structural elements. Except as otherwise indicated, the compounds are prepared by general procedures previously described herein.

*Example 27.*—2 - isopropenyl - 6 - propyl - 1,3 - dioxane-4-propanol is prepared from 176 parts of 1,4,6-nonanetriol and 70 parts of methacrolein. The beta-thiodipropionic acid diester is prepared from 228 parts of the dioxane, 71 parts of dimethyl-beta-thiodipropionate and 1 part of sodium methoxide in 300 parts of toluene.

*Example 28.*—2 - isopropenyl - 5 - fluoro-5-methylol-1,3-dioxane is prepared from 124 parts of trimethylolfluoromethane and 70 parts of methacrolein. The di(trifluoromethyl) terephthalic acid diester is prepared from 176 parts of the dioxane, 115 parts of dimethyl-2,5-di(trifluoromethyl) terephthalate, and 2 parts of sodium methoxide in 200 parts of toluene.

*Example 29.*—2 - (alphaphenylvinyl) - 5- benzyl - 5-methylol-1,3-dioxane is prepared from 210 parts of 1,1,1-trimethylol-2-phenyl ethane and 133 parts of alphaphenylacrolein. The maleic acid diester is prepared from 343 parts of the dioxane, 72 parts of dimethyl maleate and 3 parts of tetraisopropyl titanate in 300 parts of toluene.

*Example 30.*—2 - vinyl - 5 - (metatolyl) - 5 - methylol-1,3-dioxane is prepared from 196 parts of trimethylol metatolyl methane and 56 parts of acrolein. The adipic acid diester is prepared from 234 parts of the dioxane, 87 parts of dimethyl adipate and 2 parts of sodium methoxide in 200 parts of toluene.

*Example 31.*—2 - vinyl - 5 - cyano - 5 - oxyethyloxyethanol-1,3-dioxane is prepared from 205 parts of dimethylol(cyano)(hydroxyethoxyethoxy) methane and 56 parts of acrolein. The 3-methyl-3-nitrobutane-1,2-dicarboxylic acid diester is prepared from 243 parts of the dioxane, 117 parts of dimethyl 3-methyl-3-nitrobutane-1,2-dicarboxylate, and 5 parts of titanium tetraisopropoxide in 300 parts of toluene.

*Example 32.*—2 - vinyl - 5 - acetylamino - 5 - methylol-1,3-dioxane is prepared from 147 parts of N-acetyl(trimethylol) methyl amine and 56 parts of acrolein. A partial ester about equivalent to a diester is prepared from 370 parts of the dioxane and 218 parts of pyromellitic dianhydride in 300 parts of toluene.

*Example 33.*—2 - isopropenyl - 5 - hydroxymethyl - 5-ethyl-1,3-dioxane is prepared from 134 parts of trimethylolpropane and 70 parts of methacrolein. A partial ester about equivalent to a diester is prepared from 186 parts of the dioxane and 109 parts of pyromellitic dianhydride in 200 parts of toluene. The sodium salt thereof is prepared by adding 27 parts of sodium methoxide. The resulting sodium salt is converted into the corresponding mixed dioxanyl-glycidyl ester by treatment with an excess of epichlorohydrin at 100° C.

*Example 34.*—2 - (alphabutylvinyl) - 5 - ethyl - 5 - hydroxymehtyl-1,3-dioxane is prepared from 134 parts of trimethylolpropane and 112 parts of alphabutylacrolein. The pyromellitic acid tetraester is prepared from 228 parts of the dioxane and 63 parts of pyromellitic acid.

*Example 35.*—2 - (alphacyanovinyl) - 5 - (omegahydroxypropyl)-1,3-dioxane is prepared from 2-methylol-1,5-pentanediol and alphacyanoacrolein. The hexaester of mellitic acid is prepared from 71 parts of hexamethyl mellitate and 197 parts of the dioxane.

*Example 36.*—5 - betahydroxyethyl - 2 - vinyl - 1,3 - dioxane is prepared from 120 parts of 2-hydroxymethyl-1,4-butanediol and 56 parts of acrolein. The octahydronaphthalene tetracarboxylic acid tetraester is prepared from 158 parts of the dioxane, 92 parts of tetramethyl octahydronaphthalene tetracarboxylate and 2 parts of sodium methoxide in 200 parts of toluene.

*Example 37.*—The triethylene glycol ether of 2-vinyl-5-methyl-5-methylol-1,3-dioxane is prepared by condensing 198 parts of ethylene oxide with 79 parts of said dioxane. The orthophthalate diester of said ether is prepared by reacting the product with 49 parts of dimethyl orthophthalate in the presence of 1 part of sodium methoxide and 200 parts of toluene.

*Example 38.*—The succinic acid diester prepared from 73 parts of dimethyl succinate, 202 parts of 2-vinyl-5-methylol-5-hexyloxymethyl-1,3-dioxane and 1 part of sodium methoxide in 300 parts of toluene.

*Example 39.*—The orthophosphoric acid triester prepared by slowly adding 51 parts of PoCl₃ to 158 parts of 2-vinyl-5-methyl-5-methylol-1,3-dioxane dissolved in pyridine (temperature about 0° C.).

*Example 40.*—The boric acid triester prepared by reacting 21 parts of boric acid with 158 parts of 2-vinyl-5-methylol-5-methylol-1,3-dioxane under vacuum.

*Example 41.*—The benzene phosphonic acid diester prepared by slowly adding 50 parts of benzene phosphorusoxydichloride to 79 parts of 2-vinyl-5-methyl-methylol-1,3-dioxane dissolved in pyridine (temperature about 0° C.).

*Example 42.*—2 - vinyl - 4 - ethyl - 5 - propyl - 5 - methylol-1,3-dioxane is prepared from 176 parts of 3-hydroxy-4,4-dimethylol heptane and 56 parts of acrolein. The mixed dioxanyl-ethyl silicate ester is prepared from 214 parts of the dioxane and 108 parts of tetraethyl silicate in 300 parts of toluene.

*Example 43.*—The bis-dioxanyl ether prepared from 304 parts of the sodium salt of 2-vinyl-5-methylol-1,3-dioxane and 203 parts of symmetrical dichlorotetramethyl-disiloxane in 300 parts of toluene.

*Example 44.*—The carbonate prepared by slowly adding (a) a solution of 50 parts of phosgene in 100 parts of diethyl ether to (b) a solution of 192 parts of 2-vinyl-5-(beta-fluoroethyl)-5-methylol-1,3-dioxane in 200 parts of diethyl ether and 100 parts of pyridine at about 0° C.

*Example 45.*—The ketone prepared by treating 178 parts of symmetrical tetramethylol acetone with 112 parts of acrolein in the presence of 2 parts of oxalic acid and 250 parts of toluene by the general procedure used in the first part of Example 1.

*Example 46.*—1,2 - bis(2 - vinyl-1,3-dioxan-5-yl)ethane from 178 parts of 2,5-dimethylol-1,6-hexandiol and 112 parts of acrolein in the presence of 2 parts of oxalic acid, 2 parts of hydroquinone and 200 parts of hexane by the general procedure used in the first part of Example 1.

*Example 47.*—The diester prepared from 130 parts of 2-vinyl-4-carbomethoxy-5-chloro-1,3-dioxane and 50 parts of triethylene glycol in the presence of 1 part of sodium methoxide and 250 parts of toluene.

*Example 48.*—The diester prepared from 45 parts of 2 - isopropenyl-4,6-bis(para-chlorophenyl)-5-(omega-carbethoxyethyl)-1,3-dioxane and 9.7 parts of bis(hydroxymethyl) durene in the presence of 0.5 part of sodium methoxide and 75 parts of toluene.

*Example 49.*—The diester from 45 parts of 2-isopropenyl - 5-phenylsulfonyl-5-carbethoxy-1,3-dioxane and 9 parts of triethylene glycol in the presence of 0.5 part of sodium methoxide and 75 parts of toulene.

*Example 50.*—The diurethane from 184 parts of 2-vinyl-5-allyl-5-methylol-1,3-dioxane and 174 parts of tolylene diisocyanate. The diisocyanate is added dropwise and the temperature is held below 120° C.

*Example 51.*—109 parts of the tetrol having the structural formula

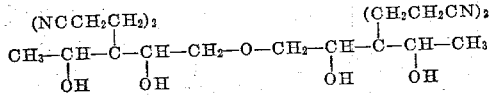

(the reduction product of the cyanoethylated tetraketone prepared by condensing acetone and diethyldiglycolate) are treated with 28 parts of acrolein in the presence of 1 part of oxalic acid and 100 parts of hexane by the general procedure used in the first part of Example 1.

*Example 52.*—S - bis(2-isopropenyl-1,3-dioxan-4-yl)-benzene from 70 parts of alphamethacrolein and 113 parts of s-bis(1,3-dihydroxypropyl) benzene in the presence of 1.5 parts of oxalic acid and 125 parts of hexane by the general procedure used in the first part of Example 1.

*Example 53.*—The diether prepared from 125 parts of the sodium salt of 2-vinyl-5-methylol-5-(omega-cyanoethoxymethyl)-1,3-dioxane and 88 parts 1,4-di(chloromethyl)benzene in 150 parts of toluene.

*Example 54.*—The tricyanurate from 192 parts of 2-vinyl-5-chloromethyl-5-methylol-1,3-dioxane and 83 parts of triallyl cyanurate in 300 parts of toluene.

*Example 55.*—The diether from 237 parts of 2-vinyl-5-(beta-chloroethoxymethyl)-5-methylol-1,3-dioxane and 74 parts of the dimethyl ether of dimethylol urea in the presence of 0.1 part of methyl acid phthalate and 300 parts of toluene at 100°–110° C.

*Example 56.*—The hexaether from 220 parts of 2-vinyl-5-(beta-fluoroethoxymethyl)-5-methylol-1,3-dioxane and 65 parts of hexa(methoxymethyl) melamine in the presence of 0.2 part of methyl acid phthalate and 300 parts of toluene.

*Example 57.*—The diester from 308 parts of ethyl beta-[4'-(2-vinyl-4-methyl-1,3-dioxan-6-yl)cyclohexyl] propionate and 31 parts of ethylene glycol in the presence of 3 parts of sodium methoxide and 300 parts of toluene.

*Example 58.*—The diamide from 174 parts of 2-vinyl-4-phenyl-6-carbethoxy-1,3-dioxane and 58 parts of hexamethylene diamine.

*Example 59.*—The diester from 45 parts of 2-vinyl-5-chloro-6 hydroxy-1,3-dioxepane and 25 parts of dimethyl cyclohexenedicarboxylate in the presence of 0.7 part of sodium methoxide and 50 parts of toluene.

*Example 60.*—The diester from 190 parts of 2-vinyl-4-methylol-1,3-dioxepane and 115 parts of dimethyl sebacate in the presence of 1.5 parts of sodium methoxide and 250 parts of toluene.

*Example 61.*—The diester from 172 parts of 2-vinyl-5-hydroxy-1,3-dioxepane and 95 parts of diethyl maleate in the presence of 6 parts of tetraisopropyl titanate and 300 parts of toluene by the general procedure of Example 3.

*Example 62.*—The diester from 200 parts of 2-vinyl-4-(omega-hydroxypropyl)-1,3-dioxepane and 158 parts of dimethyl itaconate in the presence of 6 parts of tetraisopropyl titanate and 300 parts of toluene.

*Example 63.*—2-vinyl-5-(omega-hydroxypropyl)-1,3-dioxocane is prepared from 200 parts of 4-hydroxymethyl-1,7-heptane-diol and 56 parts of acrolein by the general procedure used in the first part of Example 1.

The orthophthalic diester is prepared from 240 parts of the dioxocane and 97 parts of dimethyl orthophthalate in the presence of 2 parts of sodium methoxide and 200 parts of toluene by the general procedure used in the second part of Example 1.

*Example 64.*—The tetraether from 388 parts of the sodium salt of 2-vinyl-5-methylol-1,3-dioxocane and 194 parts of tetra(bromomethyl) methane in 200 parts of toluene.

*Example 65.*—The diester from 188 parts of 2-vinyl-6-hydroxy-1,3-dioxocane and 101 parts of diethyl adipate in the presence of 2 parts of sodium methoxide and 200 parts of toluene.

*Example 66.*—The diester from 228 parts of 2-vinyl-6-carboxyethyl-1,3-dioxonane and 40 parts of ethylene glycol in the presence of 3 parts of sodium methoxide and 300 parts of toluene.

*Example 67–79*

The following Examples 67–79 illustrate additional compounds of this invention having alpha-substituents other than hydrogen in the 2-vinyl group. The products have the characteristic, which is common to the new compounds of this invention, of polymerizing in the presence of oxygen.

The procedure of Example 1 is repeated using the indicated amounts of alpha-substituted acroleins in place of the unsubstituted acrolein used in that example. The substituent thus placed in the 2-position is indicated beside the example number.

*Example 67.*—Isopropenyl.
Alpha-methacrolein, 350 grams.
*Example 68.*—Alpha-acetoxy.
Alpha-acetoxyacrolein, 490 grams, from the acetylation of pyruvic aldehyde.
*Example 69.*—Alphphenylvinyl.
Alphaphenylacrolein, 650 grams, from the oxidation of alpha-methyl styrene.
*Example 70.*—Alphachlorovinyl.
Alphachloroacrolein, 450 grams.
*Example 71.*—Alphacyanovinyl.
Alphacyanoacrolein, 405 grams, from the dehydrochlorination of the adduct of acrolein and cyanogen chloride.
*Example 72.*—Alphacarbomethoxyvinyl.
Alphacarbomethoxy acrolein, 570 grams, from the oxidation of methyl methacrylate with selenium dioxide.
*Example 73.*—Alphafluorovinyl.
Alphafluoroacrolein, 370 grams, from reaction of sodium fluoride with the tosylate of pyruvic aldehyde.
*Example 74.*—Alphabromovinyl.
Alphabromoacrolein, 675 grams, from the dehydrobromination of alpha,beta-dibromopropionaldehyde with triethylamine.
*Example 75.*—Alpha(omega-chloropropyl)vinyl.
Alpha(omega-chloropropyl)acrolein, 660 grams, from reaction of formaldehyde with omega-chloropentanal.
*Example 76.*—Alpha(cyanoethyl)vinyl.
Alpha(cyanoethyl)acrolein, 535 grams, from cyanoethylation of beta-chloropropionaldehyde followed by dehydrochlorination.
*Example 77.*—Alphaphenoxyvinyl.
Alphaphenoxyacrolein, 740 grams, by reaction of formaldehyde with beta-phenoxyacetaldehyde.
*Example 78.*—Alphaethoxyvinyl.
Alphaethoxyacrolein, 500 grams, by reaction of formaldehyde with beta-ethoxyacetaldehyde.
*Example 79.*—Alphafluoroethylvinyl.
Alphafluoroethylacrolein, 510 grams, from reaction of omega-fluorobutyraldehyde with formaldehyde.

EXAMPLE 80

This example provides a cyclic acetal intermediate having the following structural formula

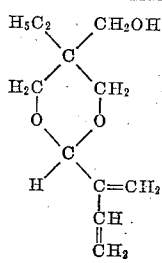

which intermediate is useful in preparing new compounds of this invention by the same general procedures as are used with other hydroxyl-bearing 2-vinyl cyclic acetals, such as the hydroxymethyl cyclic acetal intermediates prepared in Examples 1 and 2.

119 parts of alpha(2-chloroethyl)acrolein prepared from formaldehyde and omega-chlorobutyraldehyde is reacted with 130 parts of trimethylolpropane. The resulting cyclic acetal is dehydrochlorinated by treatment with caustic.

The new compounds of the foregoing examples become substantially insoluble in solvent for the original material when 0.05% of cobalt (in the form of a 10% solution of cobalt octoate) is uniformly admixed therewith (or with toluene solutions of the very viscous and solid products), the resulting mixture is drawn or flowed as a film about 2 mils thick on glass and primed steel test panels, and the thus-coated panels are permitted to stand in air at room temperature (65°–80° F.). Random samples taken during this drying, polymerizing or insolubilizing stage show, by chemical and infra red analysis, that as oxygen is absorbed acrylic ester and hydroxyl structures progressively appear and the cyclic acetal structure and vinyl unsaturation progressively disappear. The coatings are adherent and flexible. They have outdoor durability characteristics generally equal or superior to linseed oil and drying oil-modified alkyd resin coatings.

EXAMPLES 81–84

The following Examples 81–84 illustrate pigmented and clear coating compositions of this invention in which a new vinyl cyclic acetal compound of this invention can be the only organic film-forming material or can be used in admixture with any desirable proportion of other organic film-forming material—from a minute proportion, i.e. less than 1%, to substantially the whole amount of film-former, i.e. more than 99%.

*Example 81.*—Three paints are prepared by separately grinding in conventional paint grinding apparatus 100 parts each of (a) the ester of Example 1, (b) the ester of Example 2, and (c) a mixture of equal parts of these with 50 parts of titanium dioxide pigment and 50 parts of toluene. To the resulting smooth dispersions are added 0.05 part of cobalt as cobalt octoate to minimize drying time. Coatings brushed on wood and metal panels dry tack-free in about 16 hours. The dry coatings are glossy, flexible, adherent, and durable.

*Example 82.*—A paint particularly suitable for protecting exterior wood surfaces, such as on houses, is prepared by grinding 25 parts of titanium dioxide and 25 parts of asbestine extender in a mixture of 50 parts of mineral spirits, 30 parts of linseed oil and 70 parts of the ester of Example 12. Drier is added in the amount of 0.1 part of cobalt in the form of cobalt octoate.

A coating of this paint dries faster than an analogous product containing none of the new ester of this invention.

*Example 83.*—A black baking enamel is prepared by grinding 5 parts of carbon black pigment in 120 parts of a 50% solution of a 37% coconut oil modified alkyd resin in toluene. To the resulting smooth dispersion are added 60 parts of a 50% solution of butylated urea formaldehyde resin in butanol, 10 parts of the ester of Example 13 and 0.02 part of cobalt in the form of cobalt octoate. This product, when diluted, sprayed on primed metal and baked for 30 minutes at 280° F. yields a durable, adherent, and protective coating.

*Example 84.*—A clear varnish is prepared by dissolving 100 parts of ester gum in 300 parts of the ester of Example 18 at 250° F. under a blanket of carbon dioxide, diluting the mixture with 300 parts of mineral spirits and adding 0.15 part of cobalt as cobalt octoate. A thin film of this product brushed out on wood dries to a hard, glossy coating.

Coating compositions containing the new compounds of this invention are useful for the protection and/or decoration of structures and articles made of metal, wood, ceramics, glass, woven and non-woven fabrics, fibers, plaster, concrete, asbestos, wire and the like. Many varieties of bare wood contain substances which inhibit the drying of coatings containing the new compounds of this invention. Hence, when using wood, it is usually desirable to apply and dry a first or priming coat of a different composition. Primers and undercoats can also be used, if desired, on other kinds of substrates. Also, coating compositions of this invention can be used as primers or undercoats, with subsequent coatings of the same, similar, or different compositions applied thereover.

EXAMPLES 85 AND 86

The following Examples 85 and 86 illustrate polymers of the new compounds of this invention prepared by effecting polymerization by normal vinyl addition polymerization techniques, in contrast with the oxygen-effected mechanism previously described.

*Example 85.*—25 parts of the product of Example 1 are polymerized with 75 parts of styrene monomer in the presence of 1.5 parts of azobisisobutyronitrile and 100 parts of xylene under a nitrogen atmosphere at about 70° C. for 18 hours.

*Example 86.*—Example 85 is repeated, except for substituting methyl methacrylate monomer for styrene monomer.

The styrene and methyl methacrylate used in the two examples directly above merely illustrate the ethylenically unsaturated compounds with which the new vinyl compounds of this invention form copolymers. Others are acrylic, methacrylic, and maleic acid and esters of these acids, butadiene, acrylonitrile, vinyl chloride, vinylidene chloride, vinyl acetate and the like. The proportion of the new compound used in such copolymers can be from a minute proportion, e.g. less than 1%, to almost the entire mixture of monomers copolymerized, e.g. over 99%, as the desired properties dictate. Since the new compounds are polyfunctional they are believed to act as cross-linking agents. The polymerization can be carried out in bulk or in aqueous or organic media and is preferably conducted in the presence of a catalytic proportion of an organic peroxide, azo compound, per-salt or other vinyl polymerization initiator.

Such copolymers are useful in coatings, in molding and casting resins and in many of the other uses set forth hereinbefore.

Many widely different embodiments of this invention can be made, in the light of the teachings herein, in addition to those described in the specific examples. The invention is not intended to be limited except as indicated in the appended claims.

I claim:

1. A compound containing a plurality of cyclic radicals having the following structural formula:

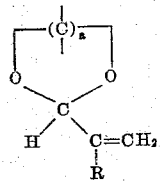

in which

represents carbon atoms in the ring, "$a$" being an integer having a value of at least 3, all but 1 of the valences of said carbon atoms are satisfied by monovalent radicals of the class consisting of hydrogen, alkyl, aryl, alkaryl, aralkyl, chloroalkyl, fluoroalkyl, alkoxyalkyl, fluoro, chloro, cyano, chloroalkoxyalkyl, fluoroalkoxyalkyl, cyanoalkoxyalkyl, cyanoalkyl, alkenyl, acylamido, phenylsulfonyl, chloroaryl and fluoroaryl, and the one remaining valence connects the cyclic radical to at least one other such cyclic radical through an interposed polyvalent radical; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy, said interposed polyvalent radical being free of substituents having an inhibiting effect on the air-drying property of said compound.

2. A compound of claim 1 in which "$a$" has a value of 3–6 inclusive.
3. A compound of claim 1 in which "$a$" has a value of 3.
4. A compound of claim 1 in which "$a$" has a value of 4.
5. A compound of claim 1 in which "$a$" has a value of 5.
6. A compound of claim 1 in which "$a$" has a value of 6.
7. A compound of claim 1 in which R is hydrogen.
8. A compound of claim 1 in which R is methyl.
9. A compound of claim 1 in which R is acetoxy.
10. A compound of claim 1 in which R is phenyl.
11. A compound of claim 1 in which R is chloro.
12. A compound of claim 1 in which R is cyano.
13. A compound of claim 1 in which R is carbomethoxy.
14. A compound of claim 1 which is an ester of a polycarboxylic acid, said ester being substantially free of unreacted carboxyl groups.
15. A compound of claim 1 which is a diester of a dicarboxylic acid.
16. A compound of claim 1 which is a triester of a tricarboxylic acid.
17. A compound of claim 1 which is a tetraester of a tetracarboxylic acid.
18. A compound of claim 1 which is an ester of a polycarboxylic acid containing polymerizable unsaturation, said ester being substantially free of unreacted carboxyl groups.
19. A compound of claim 1 which is an ester of a polyhydric alcohol and a monocarboxylic acid moiety, said moiety containing at least one radical defined by the structural formula of claim 1.
20. A compound of claim 1 which is an ester of an amphoteric moiety.
21. A compound of claim 1 in which said plurality of said radicals are connected by a radical containing ether oxygen.
22. A compound of claim 1 in which said plurality of said radicals are connected by a radical containing acetal oxygen.
23. A compound of claim 1 in which said plurality of said radicals are connected by a hydrocarbon radical.
24. The sebacic acid diester of 5-hydroxymethyl-5-methyl-2-vinyl-1,3-dioxane.
25. The maleic acid diester of 5-hydroxymethyl-5-methyl-2-vinyl-1,3-dioxane.
26. The orthophthalic acid diester of 5-hydroxymethyl-5-methyl-2-vinyl-1,3-dioxane.
27. The terephthalic acid diester of 5-hydroxymethyl-5-methyl-2-vinyl-1,3-dioxane.
28. The itaconic acid diester of 5-hydroxymethyl-5-methyl-2-vinyl-1,3-dioxane.
29. The (5-methyl-2-vinyl-1,3-dioxan-5-yl) methoxysuccinic acid diester of 5-hydroxymethyl-5-methyl-2-vinyl-1,3-dioxane.
30. The orthophthalic acid diester of 4-hydroxy-propyl-2-vinyl-1,3-dioxepane.
31. The adipic acid diester of 4-hydroxy-propyl-2-vinyl-1,3-dioxepane.
32. The azelaic acid diester of 4-hydroxy-propyl-2-vinyl-1,3-dioxepane.
33. The bisacrolein acetal of octane-1,3,6,8-tetrol.
34. A composition comprising at least one compound of claim 1 and metallic drier.
35. An article having a dry coating of a composition comprising a compound of claim 1.
36. A process for preparing an ester of (1) a hydroxy-2-alkenyl-1,3-cyclic acetal of the class consisting of dioxanes, dioxepanes, dioxocanes and dioxonanes and (2) a polycarboxylic acid, which process comprises heating a mixture of said cyclic acetal and a lower alkyl ester of said polycarboxylic acid and removing the lower alkanol produced in the reaction.
37. A catalytic process which comprises reacting (1) a hydroxy-2-alkenyl-1,3-cyclic acetal of the class consisting of dioxanes, dioxepanes, dioxocanes and dioxonanes with (2) a lower alkyl ester of a polycarboxylic acid in the presence of an alkyl orthotitanate.
38. A catalytic process which comprises reacting (1) a hydroxy-2-alkenyl-1,3-cyclic acetal of the class consisting of dioxanes, dioxepanes, dioxocanes and dioxonanes with (2) a lower alkyl ester of a polycarboxylic acid at a temperature of about 50° to 150° C. in the presence of 5 to 30 parts by weight per mole of said cyclic acetal of an alkyl orthotitanate having the formula $Ti(OR)_4$ wherein R represents an alkyl radical containing 1 to 6 carbon atoms.

39. A compound of claim 1 in which the substituents on said interposed polyvalent radical are selected from the class consisting of hydrogen and hydrocarbon radicals.

References Cited in the file of this patent

UNITED STATES PATENTS

| | | |
|---|---|---|
| 2,401,776 | Rothrock | June 11, 1946 |
| 2,441,470 | Carswell | May 11, 1948 |

FOREIGN PATENTS

| | | |
|---|---|---|
| 757,573 | Great Britain | Sept. 19, 1956 |
| 717,418 | Great Britain | Oct. 27, 1954 |
| 858,406 | Germany | Dec. 8, 1952 |